(12) United States Patent
Wanda et al.

(10) Patent No.: US 7,834,893 B2
(45) Date of Patent: Nov. 16, 2010

(54) MIXED-REALITY PRESENTATION SYSTEM AND CONTROL METHOD THEREFOR

(75) Inventors: Koichiro Wanda, Yokohama (JP); Toshikazu Ohshima, Kyoto (JP)

(73) Assignee: Canon Kabushiki Kaisha, Tokyo (JP)

(*) Notice: Subject to any disclaimer, the term of this patent is extended or adjusted under 35 U.S.C. 154(b) by 669 days.

(21) Appl. No.: 11/782,194

(22) Filed: Jul. 24, 2007

(65) Prior Publication Data

US 2008/0030499 A1 Feb. 7, 2008

(30) Foreign Application Priority Data

Aug. 7, 2006 (JP) ............... 2006-214881

(51) Int. Cl.
*G09G 5/00* (2006.01)

(52) U.S. Cl. ............ 345/633; 345/619; 345/650; 345/661; 345/676

(58) Field of Classification Search ......... 345/633, 345/619, 650, 661, 676
See application file for complete search history.

(56) References Cited

U.S. PATENT DOCUMENTS

| | | | |
|---|---|---|---|
| 5,030,945 A * | 7/1991 | Yeomans | 345/676 |
| 5,293,529 A | 3/1994 | Yoshimura et al. | |
| 5,396,590 A * | 3/1995 | Kreegar | 715/808 |
| 5,483,261 A * | 1/1996 | Yasutake | 345/173 |
| 5,729,249 A * | 3/1998 | Yasutake | 345/173 |
| 6,685,566 B2 | 2/2004 | Ohshima | |
| 6,771,294 B1 * | 8/2004 | Pulli et al. | 715/863 |
| 6,853,935 B2 | 2/2005 | Satoh et al. | |
| 6,951,515 B2 | 10/2005 | Ohshima et al. | |
| 7,056,216 B2 | 6/2006 | Ohshima | |
| 7,123,214 B2 | 10/2006 | Kuroki et al. | |
| 7,212,687 B2 | 5/2007 | Ohshima | |
| 7,289,130 B1 | 10/2007 | Satoh et al. | |
| 7,564,469 B2 * | 7/2009 | Cohen | 345/632 |
| 2004/0095311 A1 * | 5/2004 | Tarlton et al. | 345/156 |
| 2005/0062738 A1 * | 3/2005 | Handley et al. | 345/419 |
| 2006/0181519 A1 * | 8/2006 | Vernier et al. | 345/173 |
| 2006/0256110 A1 * | 11/2006 | Okuno et al. | 345/419 |
| 2007/0035562 A1 * | 2/2007 | Azuma et al. | 345/633 |

FOREIGN PATENT DOCUMENTS

| | | |
|---|---|---|
| JP | 5073661 | 3/1993 |
| JP | 2003296759 | 10/2003 |

* cited by examiner

*Primary Examiner*—M Good Johnson
(74) *Attorney, Agent, or Firm*—Fitzpatrick, Cella, Harper & Scinto

(57) ABSTRACT

In a mixed-reality presentation system, a handler for manipulating a virtual object is displayed as a virtual object. Then, manipulation of the handler by the hand(s) of an observer is detected as manipulation of the virtual object associated with the handler, and those detection results are reflected in a display of the manipulated virtual object. By dynamically changing virtual objects displaying the handler according to the size of the virtual objects displayed in a view volume of the observer presented with a mixed reality space, the observer can select a desired virtual object with ease.

8 Claims, 9 Drawing Sheets

FIG. 3

| | MINIMUM VALUE | MAXIMUM VALUE | HANDLER DISPLAY | TYPE OF HANDLER | ATTRIBUTE TO BE MANIPULATED |
|---|---|---|---|---|---|
| VIRTUAL OBJECT 1 (CAR) | 50 | 100 | ON | HANDLER A | POSITION |
| VIRTUAL OBJECT 2 (TIRE) | 50 | 100 | ON | HANDLER A | POSITION |
| VIRTUAL OBJECT 3 (SIDE MIRROR) | 20 | 70 | ON | HANDLER A | POSITION |
| VIRTUAL OBJECT 4 (BOLT) | 20 | 60 | ON | HANDLER A | POSITION |
| ... | ... | ... | ... | ... | ... |
| VIRTUAL OBJECT n | 60 | 70 | OFF | HANDLER B | ORIENTATION |

MIXED-REALITY PRESENTATION SYSTEM AND CONTROL METHOD THEREFOR

BACKGROUND OF THE INVENTION

1. Field of the Invention

The present invention relates to a mixed-reality presentation system and a control method therefor, and more particularly, to a mixed-reality presentation system and a control method therefore that enable an observer of mixed-reality space to manipulate a virtual object under observation.

2. Description of the Related Art

Recently, mixed-reality presentation systems that give an observer the sensation of being presented with a mixed reality (MR: Mixed Reality) by composite display of physical space and virtual space seamlessly have come to be widely proposed. These mixed-reality presentation systems generate composite images, in which an image (a virtual space image) rendered using computer graphics (CG) is registered and combined with an image of physical space sensed by an image-sensing apparatus such as a video camera. By generating the composite images according to a position of a viewpoint of the observer and presenting the composite images before the eyes of the observer, the observer is presented with a mixed reality space in which virtual space and physical space are combined. In the presentation of the composite images, a display device typified by a head-mounted display (HMD) is used.

In such systems, in order to present the observer with a sense of mixed reality seamlessly, it is very important to acquire continuously the position and orientation of the viewpoint of the observer, and to generate and display immediately composite images that match any change therein. For this reason, a virtual position and orientation of the viewpoint of the observer is set in virtual space based on the position and orientation of the viewpoint of the observer as measured by position and orientation sensors, and based on this setting an image of a virtual object is rendered using CG and registered with an image of physical space to generate the composite image.

In a mixed-reality presentation system, the observer can observe a composite image in which the virtual object appears actually to exist in physical space. However, in general, the observer can neither move a virtual object under observation nor change its orientation, nor can the observer change the virtual object itself.

In Japanese Patent Laid-Open No. H5-73661, a three-dimensional information conversation system is disclosed in which an operator, using a pen-like stylus 11, manipulates a three-dimensional cursor within a screen and selects, moves and the like a three-dimensional object in the screen. By adding an extension figure to the three-dimensional cursor, JP-A-H5-73661 relieves a problem of the conventional art, in that the positional relation between the three-dimensional cursor in the screen and the stylus 11 that the user manipulates is difficult to grasp and the object to be manipulated is difficult to select.

However, when an attempt is made to apply the technology described in JP-A-H5-73661 to a system that presents an observer wearing an HMD with a mixed reality, a controller like the stylus 11 must be introduced separately. Moreover, unlike the operator in JP-A-H5-73661, an observer wearing an HMD cannot directly observe the controller. Consequently, the correspondence between the position and orientation of the controller, on the one hand, and the position and orientation of the three-dimensional cursor within the composite image on the other, is very difficult to grasp. In other words, in the case of a laser pointer-like input device, because the degree of freedom of manipulation is so high, selection of a desired virtual object, as well as movement and repositioning of the virtual object after it has been selected, is difficult. Moreover, to manipulate the controller during mixed reality presentation means to lose the reality of the mixed reality, which is undesirable.

SUMMARY OF THE INVENTION

The present invention is conceived in light of the problems of the conventional art described above. According to the present invention, a mixed-reality presentation system and a control method therefor that enable a user to select and manipulate a virtual object with ease even during mixed reality presentation is provided.

According to an aspect of the present invention, there is provided a control method for a mixed-reality presentation system that presents an observer with a mixed reality by superimposing a virtual object rendered according to a position and orientation of a viewpoint of the observer onto physical space or onto a sensed image of physical space, the control method comprising: a measuring step of measuring the position and orientation of a viewpoint of the observer; a virtual object detection step of detecting a virtual object included in a view volume based on the position and orientation of a viewpoint obtained in the measuring step; and an adding step of adding a virtual object for manipulation to virtual objects to be rendered that satisfy certain display conditions from among virtual objects included in the view volume.

According to another aspect of the present invention, there is provided a mixed-reality presentation system that presents an observer with a mixed reality by superimposing a virtual object rendered according to a position and orientation of a viewpoint of the observer onto physical space or onto a sensed image of physical space, the mixed-reality presentation system comprising: a measuring unit adapted to measure the position and orientation of a viewpoint of the observer; a virtual object detection unit adapted to detect a virtual object included in a view volume based on the position and orientation of a viewpoint obtained by the measuring unit; and an adding unit adapted to add a virtual object for manipulation to virtual objects to be rendered that satisfy certain display conditions from among virtual objects included in the view volume.

Further features of the present invention will become apparent from the following description of exemplary embodiments with reference to the attached drawings.

BRIEF DESCRIPTION OF THE DRAWINGS

FIG. 3 is a drawing showing one example of a table storing criteria for determining whether or not a usable handler display is necessary in the mixed-reality presentation system according to the embodiment of the present invention;

DESCRIPTION OF THE EMBODIMENTS

Preferred embodiments of the present invention will now be described in detail in accordance with the accompanying drawings.

Figure 1:
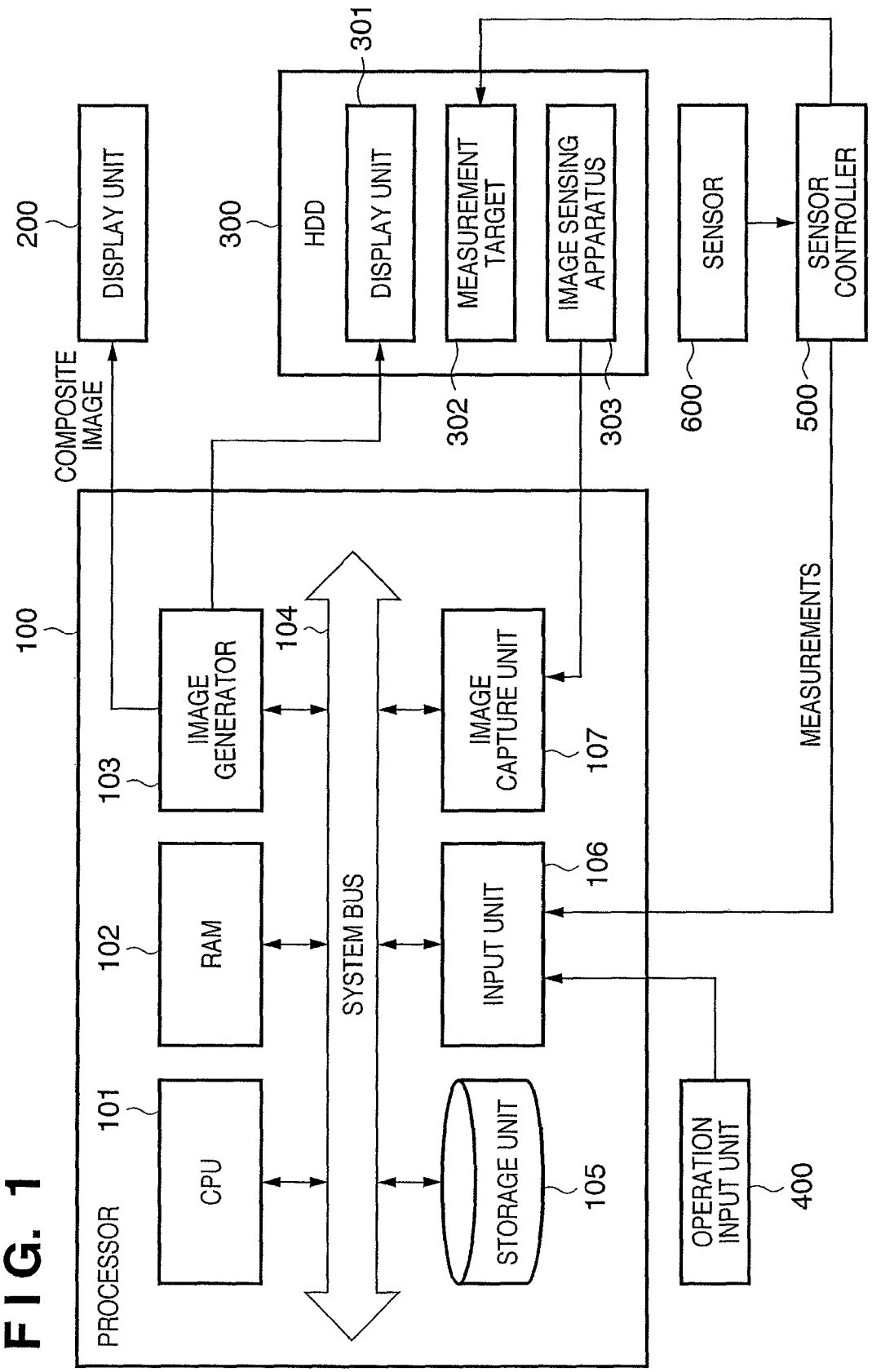
FIG. 1 is a block drawing showing one configuration of a mixed-reality presentation system according to an embodiment of the present invention.

FIG. 1 is a block drawing showing one configuration of a mixed-reality presentation system according to a first embodiment of the present invention.

In FIG. 1, a processor 100 is comprised of a CPU 101, a RAM 102, an image generator 103, a system bus 104, a storage unit 105, an input unit 106, and an image capture unit 107. The processor 100 may, for example, be implemented by any ordinary computer commercially available having a video capture function.

The CPU 101, based on programs stored in one or more of a ROM, not shown, the RAM 102, and the storage unit 105, controls overall system processing. The CPU 101 is connected by the system bus 104 so as to enable two-way communication with the RAM 102, the image generator 103, the storage unit 105, the input unit 106, and the image capture unit 107. The RAM 102 temporarily holds program code and program control information, CG data, and measurement position data and the like supplied through the system bus 104.

The image generator 103 is implemented by a graphics board or the like, and ordinarily has a graphics memory, not shown. Image information generated by a program executed by the CPU 101 is written to the graphics memory of the image generator 103 through the system bus 104. The image generator 103 converts the image information written to the graphics memory into image signals according to the configuration of a display unit 200 and transmits the image signals to the display unit 200. It is not always necessary that image generator 103 have the graphics memory, and a portion of the area of the RAM 102 may be used as a graphics memory.

The system bus 104 is connected so as to enable two-way communication between the units that comprise the processor 100.

The storage unit 105 is implemented by an auxiliary storage device such as a hard disk drive or the like. The storage unit 105 holds, for example, the following data:

program code that the CPU 101 executes, and program control information;
virtual space CS object data (virtual object data):
data relating to a position and orientation of an HMD 300;
handler display type and setting data; and
parameters that control the system, and the like.

The input unit 106 functions as an interface for a variety of external devices. For example, the input unit 106 inputs signals from an external device connected to the processor 100 as data, and writes the data to the RAM 102 via the system bus 104. In addition, the input unit 106 accepts user instructions input via an operation input unit 400.

The image capture unit 107, like a video capture board or the like, for example, inputs moving image signals and writes image data to the RAM 102 or the graphics memory via the system bus 104. It should be noted that the image capture unit 107 is not required if the HMD 300 is an optical see-through-type without an image sensing apparatus 303.

The display unit 200 is, for example, a Braun tube, a liquid crystal display, or other such display device, and displays to an operator of the mixed-reality presentation system of the present embodiment such things as system operating status, HMD 300 position information, and UI for various settings and operations. Therefore, the display unit 200 is usually a larger display device than a display unit 301 of the HMD 300.

the HMD 300 is a display device that a user (operator) experiencing mixed reality provided by the mixed reality presentation system of the present embodiment wears. The HMD 300 is comprised of a display unit 301, a measurement target 302, and the image sensing apparatus 303. In the present embodiment, in order to facilitate description and understanding, the HMD 300 used in the system is a single device. However, it should be noted that the mixed-reality presentation system of the present embodiment may have multiple HMD 300.

In addition, although in the present embodiment the HMD 300 is a video see-through type, the HMD may be an optical see-through-type HMD. These differ in the methods they use to display physical space to the observer. The video see-through type displays physical space to the observer using sensed images sensed with the image sensing apparatus 303. In the case of the optical see-through-type HMD, the observer is allowed to observe physical space through a half-mirror-like display. Therefore, in the case of the optical see-through-type HMD, at least for the purpose of presenting physical space to the observer, the image sensing apparatus 303 is unnecessary.

The display unit 301 is, for example, implemented by a lightweight display device such as an LCD or the like. If the HMD 300 is a stereo type, the display unit 301 has a left eye display device and a right eye display device. The display unit 301 displays before the eyes of the observer composite images transmitted from the image generator 103.

The image sensing apparatus 303 is, for example, a video camera, and senses images of physical space as observed from a viewpoint of an observer wearing the HMD 300. The sensed images are transmitted continuously to the image capture unit 107 as image signals. It should be noted that, when presenting stereo video to the HMD 300, the mage sensing apparatus also is implemented by a stereo camera.

The measurement target 302 is a measurement target necessary in order for a sensor 600 to detect a position and an orientation of the HMD 300, and is mounted on the HMD 300.

The operation input unit 400 is, for example, an ordinary input device such as a keyboard, mouse, or the like used with a computer. The operation input unit 400 is used mainly by the operator of the present system in order to input settings and operations to the system, and mainly to input instructions other than manipulation of a virtual object.

The sensor 600 measures the position and orientation of the measurement target 302 mounted on the HMD 300 that the observer wears as the position and orientation of the HMD 300. A sensor controller 500 controls the sensor 600, and acquires measurement data from the measurement target 302 and the sensor 600. The sensor controller 500 calculates position and orientation information of the measurement target 302 based on the measurement data and transmits that information as measurements to the input unit 106.

In the present embodiment, there are no particular restrictions on the configuration used to measure the position and orientation of HMD 300, and it is therefore possible to dispose the sensor 600, the measurement target 302 and the like according to the type and configuration of sensor actually used. The following description uses a specific example of a usable sensor and its method of application.

When using as an example of an optical-type sensor the OPTOTRAK3020 (product name) optical sensor from Northern Digital Inc., the measurement target 302 is comprised of a light emitting device whose flash is controlled by the sensor controller 500. The sensor 600 is comprised of a light receiving device, and observes the light emitted by the measurement target 302. The sensor controller 500 calculates the position and orientation of the measurement target 302 based on the observation data and the disposition data of the sensor 600.

In addition, when using the optical-type sensor HiBall (product name) from 3rd Tech Inc. as another example of the optical-type sensor, the measurement target 302 is comprised of a light receiving device and the sensor 600 is comprised of a light emitting device. The sensor 600 flashes in accordance with control exerted by the sensor controller 500. The measurement target 302 observes the light emitted by the sensor 600. The sensor controller 500 calculates the position and orientation of the measurement target 302 based on the observation data of the measurement target 302 and the disposition data of the sensor 600.

Next, when using the magnetic sensor Fastrak (product name) from Polhemus Co. as an example of a magnetic-type sensor, the measurement target 302 is comprised of a receiver that observes a magnetic field that a transmitter of the sensor 600 generates, and generates observation data. The sensor 600 is comprised of the transmitter and generates a magnetic field in accordance with a control exerted by the sensor controller 500. The sensor controller 500 calculates the position and orientation of the measurement target 302 based on the observation data of the measurement target 302.

It is also possible to use sensors other then those described above and measure the position and orientation of the HMD 300 using sensed images of the HMD 300. For example, a marker may be provided on HMD 300 and the position and orientation of HMD 300 may be calculated using the position of the marker in an image sensed by an image sensing apparatus of known position and orientation. In this case, the measurement target 302 is comprised of the marker, the sensor 600 is comprised of the image sensing apparatus, and the sensor controller 500 is comprised of an image processor that calculates the position and orientation of the HMD 300 from position information of the image sensing apparatus and from the sensed image.

Further, the position and orientation of the HMD 300 may be calculated using distinctive features of a sensed image of the observer sensed using an image sensing apparatus of known position and orientation, without attaching any particular marker. In this case, the measurement target 302 is the observer.

Further, multiple markers whose three-dimensional positions are known may be set in physical space sensed by the image sensing apparatus 303 of the HMD 300, and the position and orientation of the HMD 300 may be calculated from the positions of the markers contained in the image sensed by the image sensing apparatus 303. Moreover, the position and orientation of the HMD 300 may be similarly calculated using distinctive features of an image of sensed physical space (for example, images of fixed objects and the like) in place of the markers.

It goes without saying that the methods for measuring position and orientation described above may also be combined as convenient and used.

Next, a description is given of how an observer wearing the HMD 300 and experiencing mixed reality (hereinafter, during MR presentation) can carry out manipulation of a virtual object in the mixed-reality presentation system of the present embodiment having the configuration described above.

Figure 2:
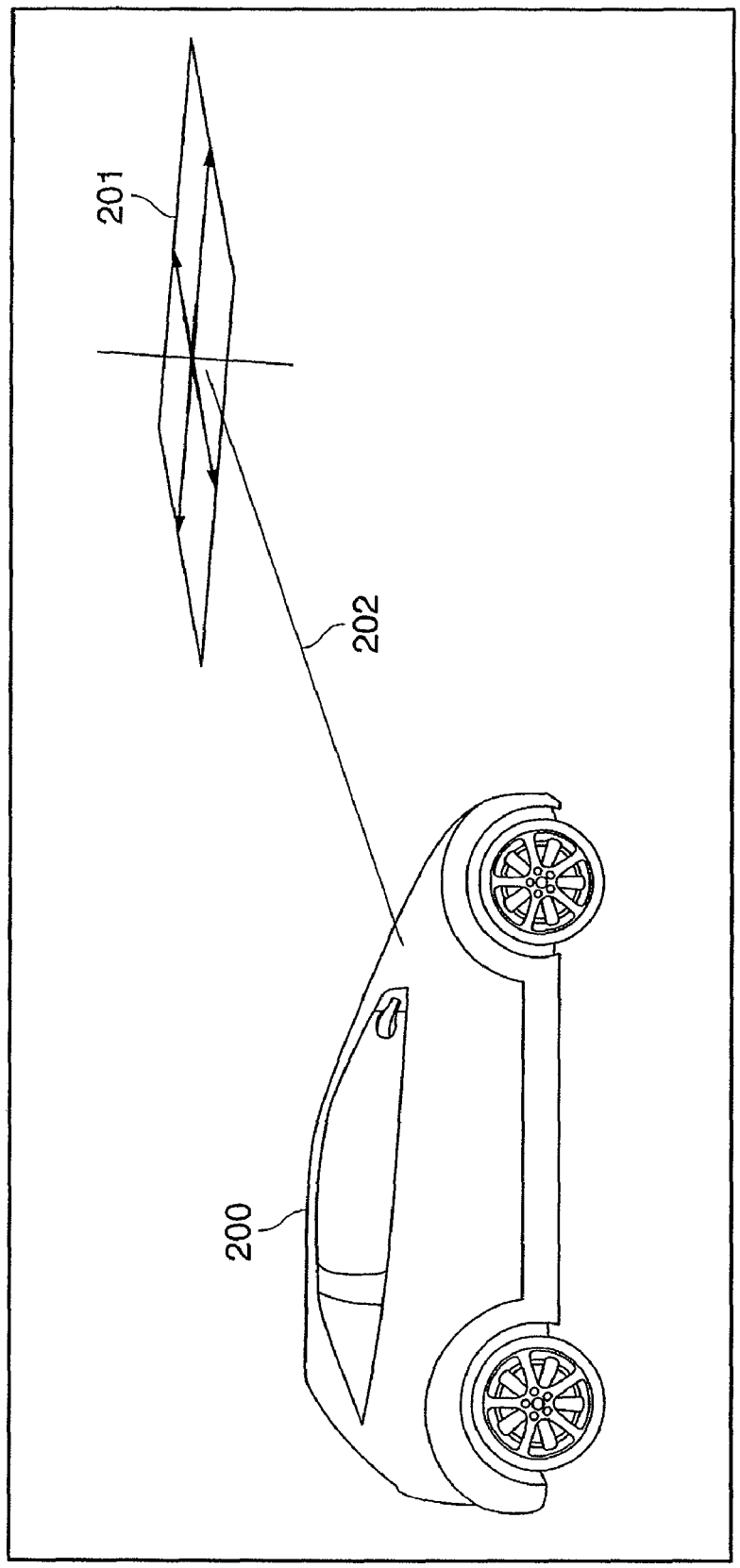
FIG. 2 is a drawing showing an example of a composite image displaying a virtual object 201 for parallel movement of a car 203 rendered using CG as an example of a virtual object, in the mixed-reality presentation system according to the embodiment of the present invention.

FIG. 2 is a drawing showing an example of a composite image displaying a virtual object for manipulation 201 (hereinafter referred to as a handler) for parallel movement of a car 203 rendered using CG as an example of a virtual object. Although for convenience an image of physical space is not shown in FIG. 2, in reality, the image shown here is combined with an image of physical space sensed by the image sensing apparatus 303.

It should be noted that, in FIG. 2, a link 202 is a display for indicating a virtual object that is the target of manipulation of the handler 201 among a plurality of objects present in the mixed reality space displayed by the composite image. In the present embodiment, the link 202 is a straight line connecting the handler and the manipulation target. However, the link 202 may be any shape provided that it can make clear to the observer an association between the handler 201 and the virtual object that is to become the manipulation target.

For example, in a case in which virtual objects that are to become manipulation targets and virtual objects that are not to become manipulation targets are mixed together in a complex situation, the link 202 may be a bounding display or a highlighted display of the virtual object that is to become the manipulation target. Of course, a straight-line link 202 and a bounding box display or the like may be combined. In addition, in FIG. 2, the handler 201 has a shape that is patterned after the coordinate axes of a three-dimensional coordinate system. Although there is no particular restriction on the shape of the handler 201, a shape that is easy for the observer to manipulate is preferable.

Figure 4:
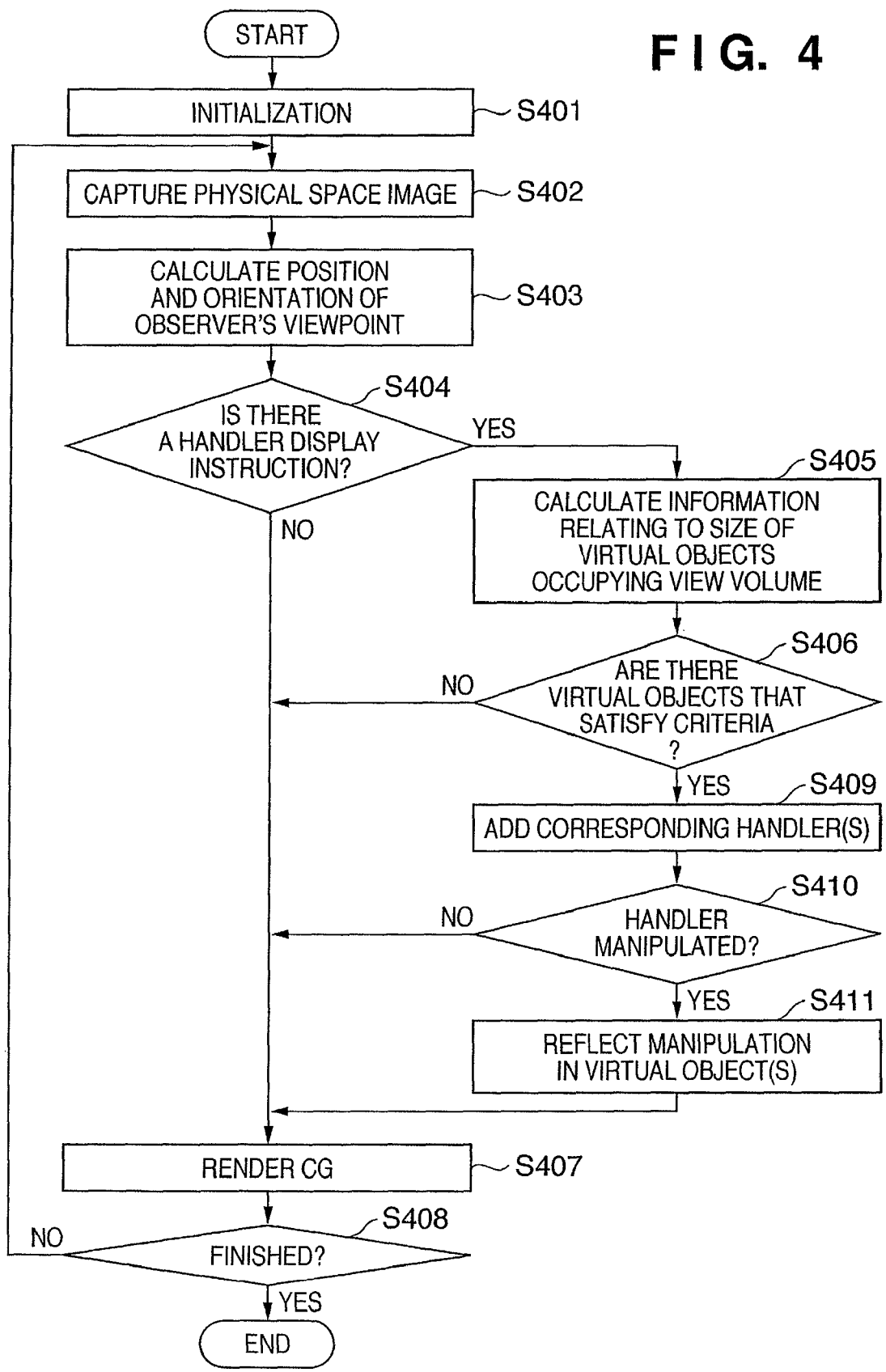
FIG. 4 is a flow chart illustrating processing relating to manipulation of a virtual object in the mixed-reality presentation system according to the present invention.

FIG. 4 is a flow chart illustrating processing relating to manipulation of a virtual object in the mixed-reality presentation system of the present invention.

In S401, the CPU 101 initializes the system. Specifically, for example, a process in which the CPU 101 reads required data such as CG object (virtual object) data, handler CG data, programs and so forth from the data storage unit 105 to the RAM 102, is included in the initialization process.

In S402, the image capture unit 107 captures images of physical space (physical space images) sensed by the image sensing apparatus 303 and writes the images to the RAM 102. Then, the CPU 101 reads the physical space images from the RAM 102, performs correction processes thereon as required, and writes the images to a frame buffer of the graphics memory of the image generator 103. It should be noted that the images taken in by the image capture unit 107 may be written directly to the frame buffer of the image generator 103 without going through the RAM 102. It should be noted that, where an optical see-through-type HMD having no image sensing apparatus 303 is used, the process of S402 is unnecessary.

In S403, the input unit 106 acquires measurements output by the sensor controller 500 (the position and orientation of the measurement target 302) and provides these to the CPU 101. The CPU 101, based on the relative positions of the measurement target 302 and the position of the viewpoint of the observer, as well as the measurements from the sensor controller 500, calculates the position and orientation of the viewpoint of the observer and writes these to the RAM 102.

In S404, the CPU 101 determines whether or not to display a handler for manipulation of a virtual object. This step may be omitted if the handler is always displayed. In the present embodiment, the handler is displayed in response to an instruction from the observer, and in this step it is determined whether or not handler display is necessary based on the presence or absence of instruction input.

As described above, from the standpoint of not losing the reality of the mixed reality, it is undesirable to force the observer to operate an input device for inputting instructions. As a result, in the present embodiment, a gesture of the observer, more specifically, a gesture of the hand(s) of the observer included in the physical space image, is detected as instruction input.

The CPU 101 designates an image region of the observer's hand(s) from the physical space image, and recognizes the observer's hand gestures from their shape and changes in their shape. There is no particular restriction on the method of detection of the region of the observer's hand(s). For example, as is disclosed in Japanese Patent Laid-Open No. 2003-296759, a method that uses color information may be employed.

Thus, as described above, in the present embodiment, the observer can instruct the presence or absence of the display of the handler without using a special input device to do so. As a result, there is no loss of the reality of the mixed reality. Moreover, the observer is able to use the handler for manipulating the virtual object only when it is necessary.

It is also possible not only for the observer but also for the system operator to provide handler display instructions, through the operation input unit 400. For example, in a case in which it is difficult for the observer to carry out instruction input by hand gesture, or the observer is not used to the system, the operator could instruct the display or the erasure of the handler.

In S404, if it is determined that there is no instruction to display the handler, processing proceeds to S407. In S407, using the position and orientation of the viewpoint of the observer calculated by the CPU 101 as well as the CG object data read out to the RAM 102 in the initialization process, the image generator 103 renders an image of virtual space as observed from the position and orientation of the viewpoint of the observer. Then, the image generator 103 superimposes the image of virtual space onto the image of physical space read out from the RAM 102 and combines the two to generate a composite image. The composite image is then supplied to the display unit 200 and the display unit 301 of the HMD 300 by the image generator 103 and displayed at each display unit.

It should be noted that, as described above, when implementing stereo vision in the HMD 300, the physical space image that is taken in from the image sensing apparatus 303 is a left-right pair of stereo images. Then, calculations of the position and orientation of viewpoint are performed for the right eye and for the left eye, with generation of the virtual space image and generation of the composite image also being performed for an image for the right eye and an image for the left eye, respectively. By displaying the image for the right eye on the right eye display device of the display unit 301 of the HMD 300 and displaying the image for the left eye on the left eye display device of the display unit 301 of the HMD 300, the observer can be given stereo vision. On the display unit 200 for the operator, for example, the image for the right eye and the image for the left eye may be display in separate windows, or display may be switched between one and the other. Hereinafter, for ease of description and understanding, no particular distinction is made between processes relating to images for the right eye and processes relating to images for the left eye. However, it should be emphasized that the same process can be applied also to systems that handle stereo images.

In S408, if, for example, there is no end instruction input from the operator through the operation input unit 400, the CPU 101 returns to S402 and continues processing. If an end instruction is input, the CPU 101 ends processing.

If in S404 the CPU 101 determines that an instruction to display a handler is input, the CPU 101 proceeds to S405 and calculates information relating to sizes of virtual objects occupying a view volume of the observer.

The view volume is usually a quadrangular pyramid, with the position of the viewpoint of the observer as its apex, its vertical angle as a view angle, and a line-of-sight direction as a height direction. Only those virtual objects that are inside the view volume are rendered. The height of the quadrangular pyramid, that is, the rendering of virtual objects present up to what distance from the position of the viewpoint, is determined in advance. A proportion occupied by the virtual objects can be obtained from the volume of the portions of the virtual objects included in the view volume and from the view volume itself as information relating to the size of the virtual objects occupying the view volume. As the distance between the virtual object and the viewpoint decreases, that is, as the distance to the observer decreases, the virtual objects are rendered larger, and therefore the proportion of the virtual objects occupying the view volume increases.

In S405, in the calculation of the proportion of the view volume that the virtual objects occupy, approximate volumes may be used instead of volumes calculated using the object data of the virtual objects. For example, a virtual object bounding box, a sphere in which the virtual object is inscribed, the number of boxels that comprise the virtual object or the like may be used.

In addition, besides the proportion of the view volume occupied by the virtual objects, a surface area of a projected image of the virtual objects occupying a clipping plane or a number of pixels in the images of the virtual objects may be used. More specifically, the proportion of a surface area or a number of pixels of the virtual object images contained in the composite image generated by the image generator 103 may be used. Further, a number of polygons in the virtual objects, a distance between the virtual objects and a viewpoint of the observer, a movement velocity of the viewpoint of the observer and the virtual object, a range within a color space of the virtual object, and so forth may be used as well.

In S406, the CPU 101 determines whether or not the value calculated in S405 satisfies certain preset criteria.

As described above, information regarding the size of the virtual objects can be calculated from a variety of viewpoints in S405. As a result, the criteria used in S406 are set to different value ranges depending on the type of value calculated in S405.

The criteria used in S406 are usually saved in the storage unit 105, and stored in the RAM 102 when activating the system or as necessary. Moreover, although in the present embodiment the criteria for determining whether or not to display the handler are described as settings for the system as a whole, these criteria may be changed with each user. In addition, the same user may switch between multiple criteria. Moreover, setting the criteria for determining whether or not to carry out handler display taking into consideration the correct distance for manipulating the virtual object that the observer wishes to manipulate and the purpose of that manipulation makes it possible to display the correct manipulation handler to the observer.

FIG. 3 is a drawing showing one example of a table holding criteria for determining whether or not a usable handler display is necessary in the mixed-reality presentation system of the present embodiment.

As shown in FIG. 3, for each virtual object disposed in virtual space, a numerical range (minimum value and maximum value) is defined as criteria. In addition, when within the numerical range, the handler display operation (display or erasure), the type of handler to be applied, and what type of operations are permitted with the handler, are also defined.

In S406, in the event that the observer is at a position remote from the virtual object and the size of the virtual objects occupying the view volume does not meet the criteria shown in FIG. 3, the CPU 101 advances processing to S407, and then proceeds to render only a CG of the virtual object, without displaying the handle.

By contrast, as the observer approaches the virtual object, the size of the virtual object occupying the view volume of the observer increases. For example, once the size of a virtual object 1 occupying the view volume reaches 50 (the units differ depending on the type of value calculated in S405), the CPU 101 advances processing to S409 and adds a handler A for manipulating the virtual object 1 as a CG object to be rendered.

In the present embodiment, the virtual object 1 is an entire automobile, and virtual objects 2 and above are portions of the virtual object 1. In this case, the first thing that satisfies the criteria shown in FIG. 3 is the largest virtual object 1. Therefore, at the point when a handler for the virtual object 1 begins to be displayed, handlers for the other virtual objects are not added.

In S410, the CPU 101 determines whether or not the user has performed a manipulation of the handler, and if the handler has not been manipulated then processing proceeds to S407. In S407, the image generator 103 adds to the virtual object the handler added in S409 and a link between the handler and the virtual object and generates a virtual space image rendered using CG, after which the image generator 103 generates a composite image. At this time, the image generator 103, based on the position and orientation of the viewpoint of the observer, displays the handler inside the view volume of the observer without overlapping the virtual object that is the manipulation target, and further, as a virtual object existing in a range within reach of the hand(s) of the observer.

Figure 5:
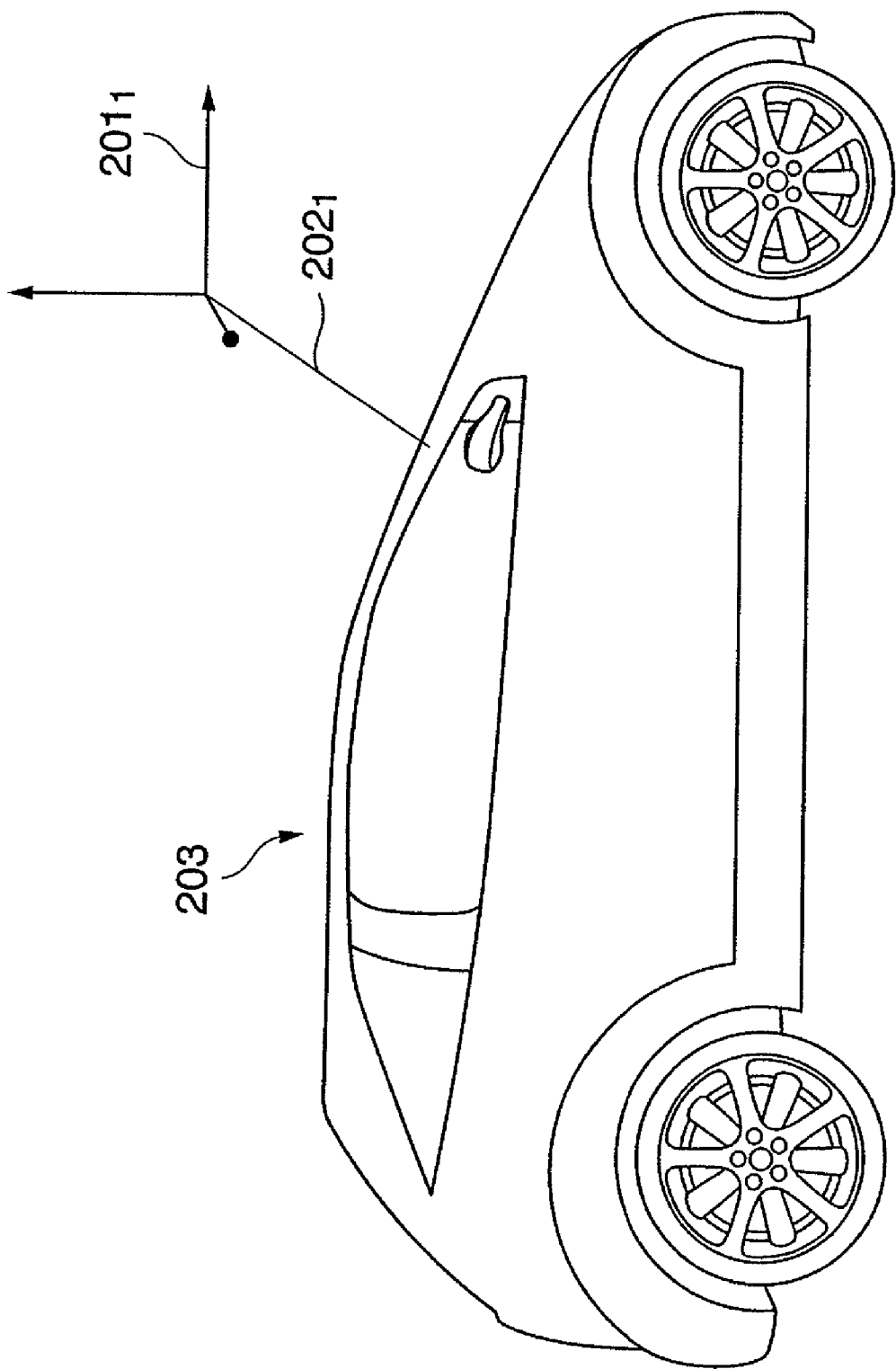
FIG. 5 is a drawing showing a display example of the handler in the mixed-reality presentation system according to the embodiment of the present invention.

FIG. 5 is a drawing showing a state in which the handler A for the virtual object 1 is displayed. As described with reference to FIG. 2, a handler A $201_1$ has a shape patterned after the coordinate axes of a three-dimensional coordinate system, and is displayed together with a link $202_1$ indicating an association between the handler A $201_1$ and the manipulation target, virtual object 1 203.

In addition, it is possible to display handlers capable of different operations depending on the type of virtual object that is to become the manipulation target, the distance to the observer, and so on. Specifically, the following types of handlers can be given as examples:

a handler that is capable of moving the virtual object only in the xz plane of a Yup coordinate system, and further, only of parallel movement;

a handler capable only of moving the virtual object so as to contact another virtual object (for example, a handler that only allows a change in position of a side mirror of the car such that it moves to contact a body); and a handler capable only of rotating about a particular axis within a coordinate system of the virtual object.

Thus, by displaying handlers that facilitate regular operations that the user wishes to carry out without too high a degree of freedom of manipulation, the ability to manipulate virtual objects can be improved.

In the present embodiment, the link 202 used as a display to show the association between the handler 201 and the virtual object 1 203 is shown as a straight-line CG object. However, as described above, the link may be of any form provided that it is capable of showing the association between the virtual object and the handler.

Moreover, it is also possible to enable the user to select, from among a plurality of handlers, a handler suited for a desired manipulation of a single virtual object that is to become the manipulation target. For example, if the carrying out of a certain predetermined manipulation of a handler being displayed is detected, the types of handlers to be displayed may be changed sequentially.

It should be noted that, so long as it continues to satisfy the criteria, a handler that satisfies the criteria continues to be displayed even when the observer moves. Moreover, even after the observer faces in a different direction and the virtual object moves outside the view volume, causing the corresponding handler to no longer be displayed, once the virtual object again enters the field of view, the handler is displayed at a position within reach of the observer's hand(s). Thus the handler is displayed just as if it were following the observer.

Further, if the movement of the observer causes the size of the virtual object occupying the view volume to exceed the maximum value of the criteria or fall below the minimum value of the criteria, then based on the determination made in S406 the handler is no longer displayed. For example, in the example shown in FIG. 3, once the size of the virtual object 1 exceeds 100, the handler for manipulating the virtual object 1 is no longer displayed.

Figure 6:
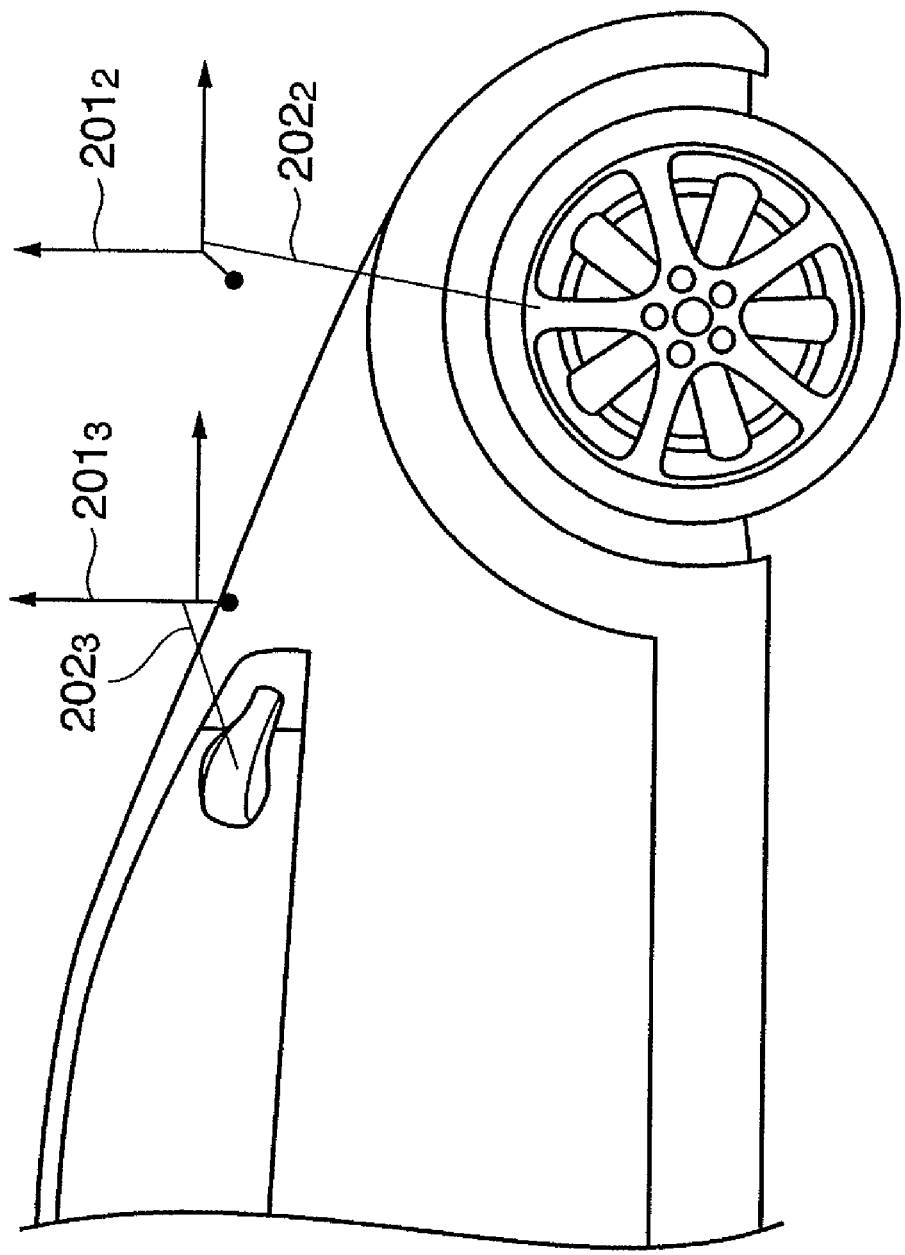
FIG. 6 is a drawing showing a display example of the handler in the mixed-reality presentation system according to the embodiment of the present invention.

The processes of from S406 to S411 are performed on all virtual objects at least a portion of which are within the view volume. Therefore, the virtual objects for which handlers are displayed changes depending on the movement of the observer. FIG. 6 shows a state in which, as the observer approaches the virtual object 1, the handler $201_1$ for the virtual object 1 is erased and a handler $201_2$ for the virtual object 2 (tire) and a handler $201_3$ for the virtual object 3 (side mirror) are displayed.

Figure 7:
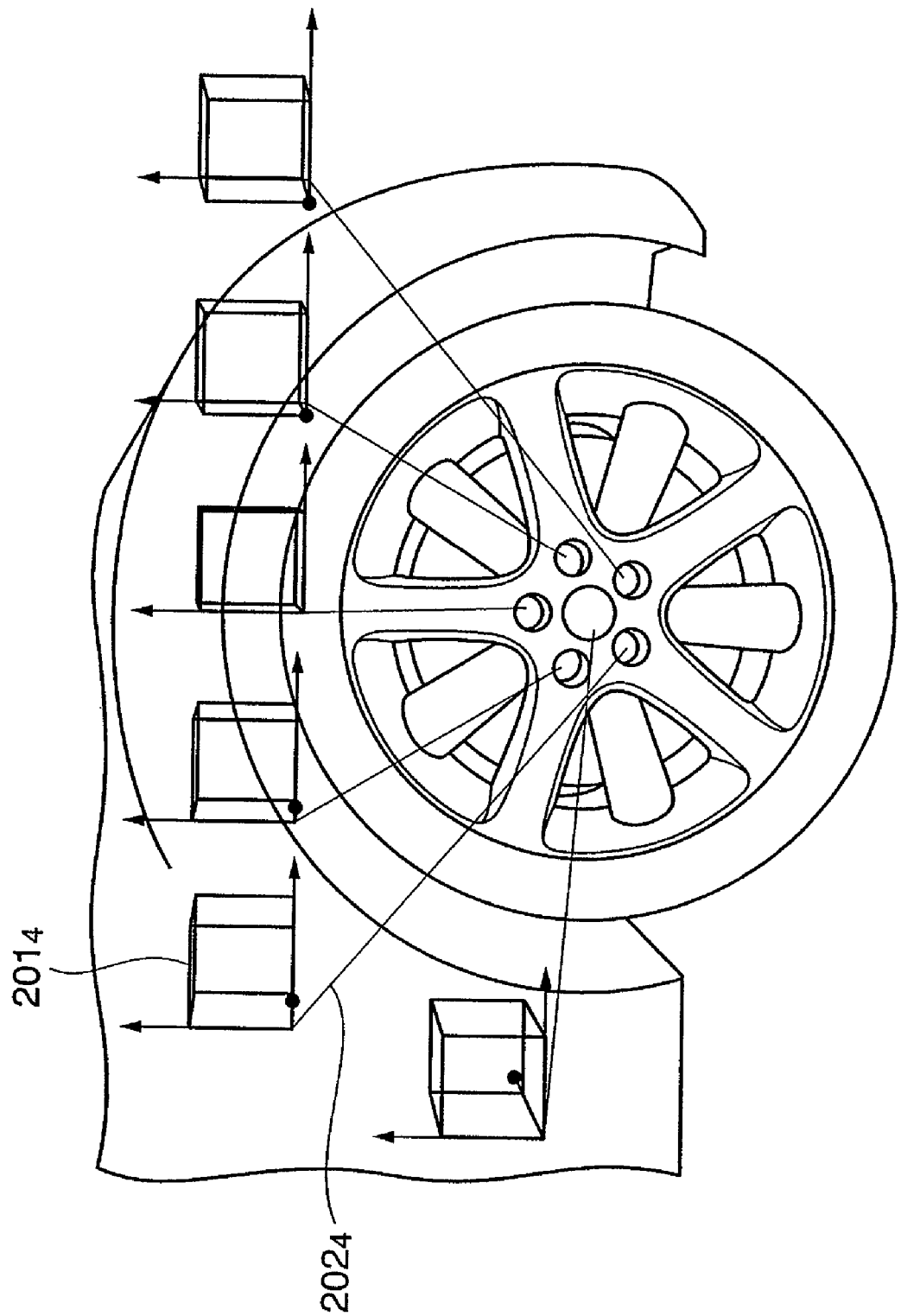
FIG. 7 is a drawing showing a display example of the handler in the mixed-reality presentation system according to the embodiment of the present invention.

In addition, FIG. 7 shows a state in which the handlers for the virtual objects 1 through 3 are erased and only a handler $201_4$ for a virtual object 4 (bolt) and its links $202_4$ are displayed. In FIG. 7, because multiple virtual objects 4 are present (6), a handler $201_4$ and a link $202_4$ are displayed for each one.

In a procedure like that described above, the handler with which the observer manipulates the virtual object it is displayed to the observer, enabling the observer to carry out manipulation of the virtual objects with ease. A description is now given of the manipulation of the virtual object by the observer and the processing performed by the present system in response thereto.

Figure 8:
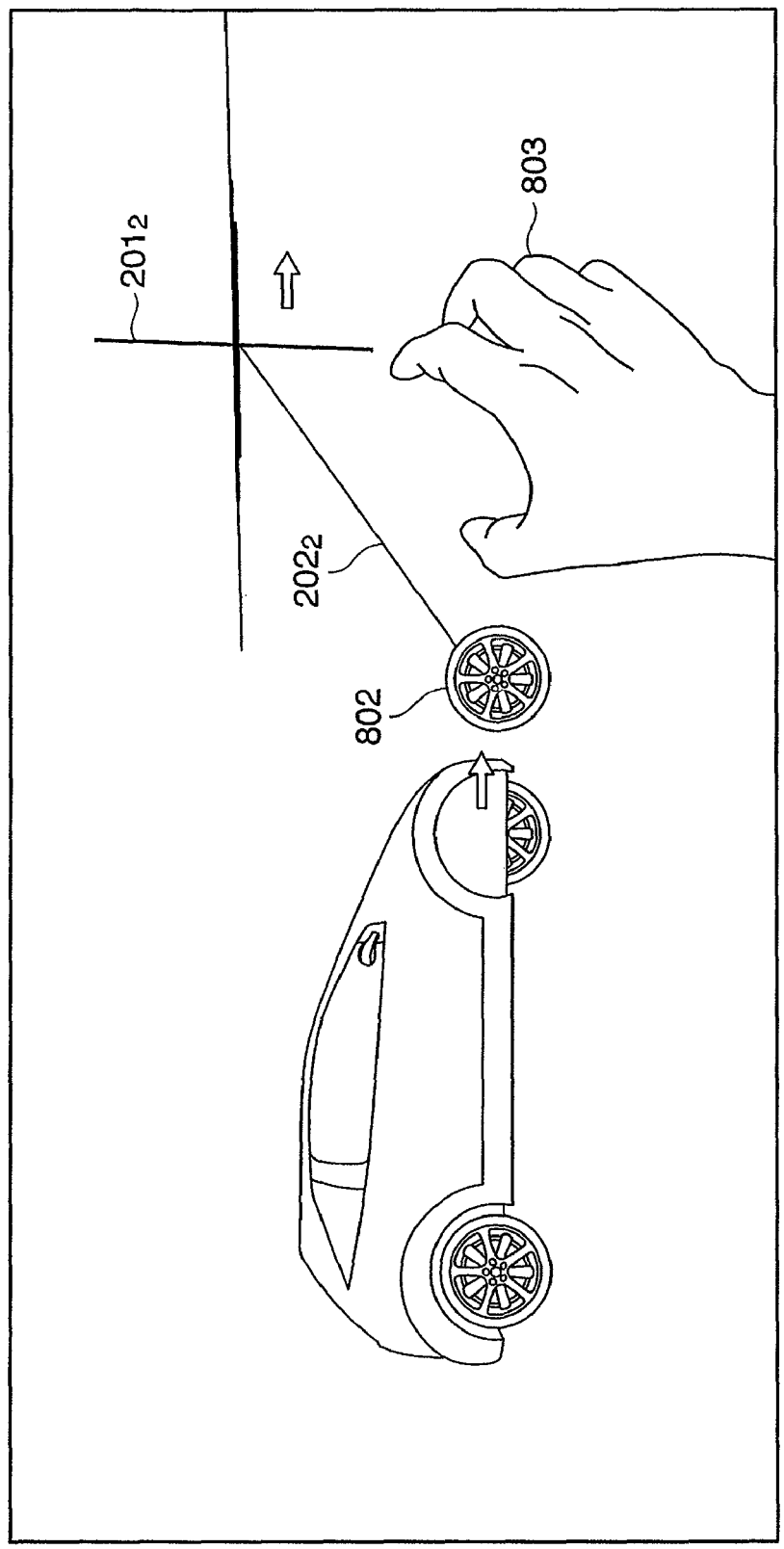
FIG. 8 is a drawing showing a display example of the handler in the mixed-reality presentation system according to the embodiment of the present invention.

In S409, the handler $201_2$ for the virtual object 2 (tire 802) is displayed as shown in FIG. 8.

In the present embodiment, when the observer manipulates the handler, first, the observer first moves a hand 803 so that an image of one's own hand is displayed near the handler that the observer wishes to manipulate. Then, the observer forms the hand into a shape like that used to grasp the handler, and in that state moves the hand in parallel, or twists the wrist, causing the handler to move in parallel or rotate.

Thus, as described above, the CPU 101 designates an image region of the observer's hand(s) from the physical space image and can recognize shapes and movements of the observer's hand(s) based on changes in the shape and position of the image region of the hand(s).

For example, in S410, the CPU 101 detects movement of the image region of the hand(s) having a shape such as to manipulate the handler $201_2$ in a direction of an arrow (toward the right in the drawing), which enables the CPU 101 to recognize that the handler has been manipulated and advances processing to S411.

In S411, the CPU 101 changes the positions of the virtual object that is the manipulation target and the CG object of the handler according to the operation performed on the handler (the type and extent of manipulation). By so doing, in S407 manipulation of the virtual object is reflected in the composite images that the image generator 103 generates.

By for example executing the processes of from S402 to S411 at a speed that matches the generation rate of the composite images (for example, 30 frames/minute), the manipulations performed by the observer are reflected in the composite images substantially in real time.

Figure 9:
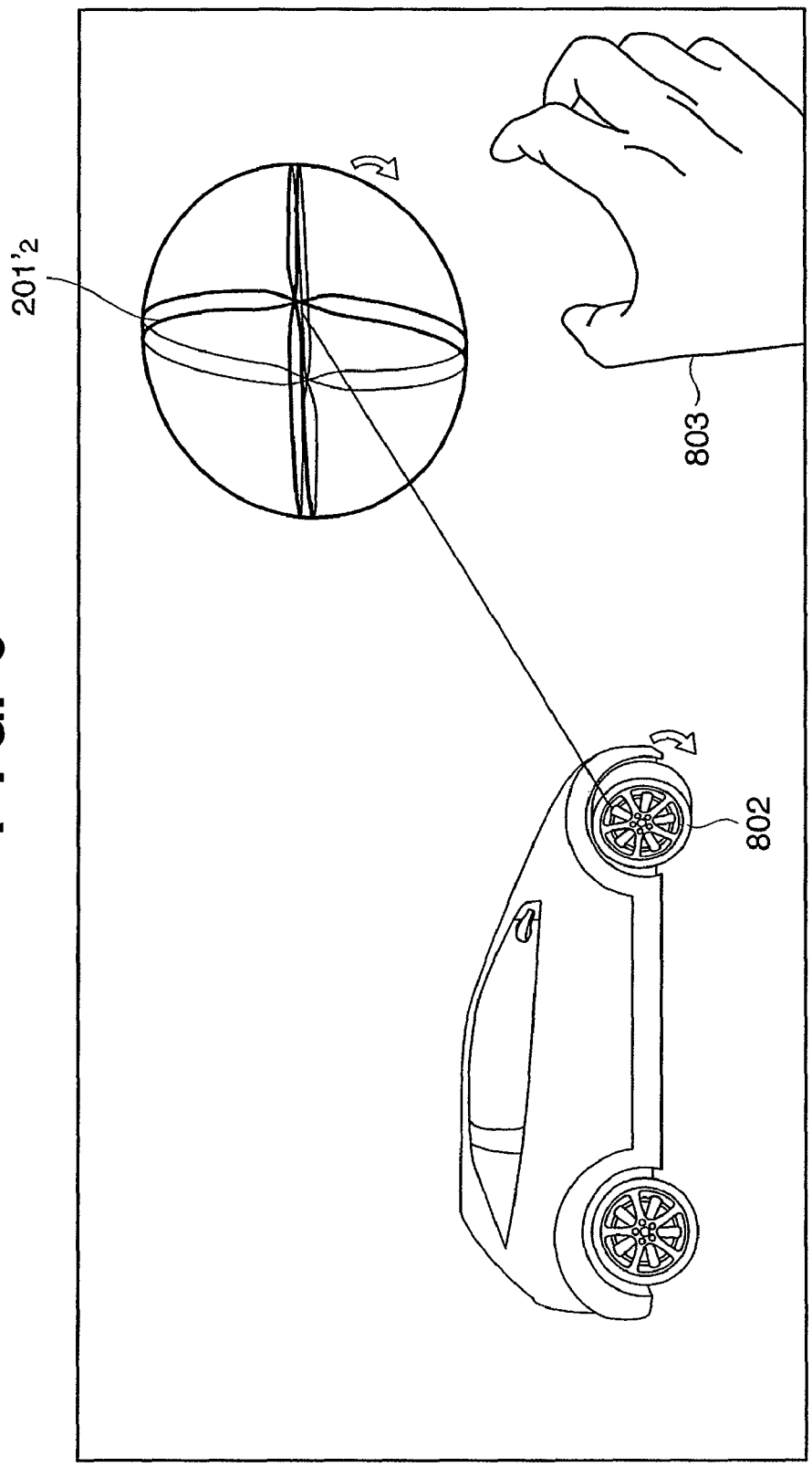
FIG. 9 is a drawing showing a display example of the handler in the mixed-reality presentation system according to the embodiment of the present invention.

FIG. 9 is a drawing showing a state in which a handler for the purpose of rotary manipulation of the virtual object 2 is displayed. The handler $201_2$ used for parallel movement (shown in FIG. 8) and the handler $201'_2$ used for rotation are of different shapes. By visually distinguishing the handlers according to the type of manipulation they perform, the observer can intuitively grasp the application of the handler from the shape of the handler.

By a gesture of twisting the wrist the handler $201'_2$ is manipulated, and an extent of manipulation according to the direction and extent of the twist of the wrist is applied to the virtual object that is the manipulation target.

It should be noted that it is possible to detect and recognize manipulation of the handler using any method capable of detecting the position and movement of the hand(s) of the observer. For example, a device such as a hand glove equipped with a magnetic sensor may be installed in the operation input unit 400, and the extent of manipulation of the handler measured from the position and orientation of the handler and the position and orientation of the hand of the observer.

Thus, as described above, according to the present embodiment, by manipulably displaying a handler that is a virtual manipulation means for the purpose of manipulating a virtual object, a user can manipulate the virtual object while being presented with a mixed reality.

Further, the observer can select a single virtual object from among a group of multiple virtual objects and perform regular manipulations of the selected virtual object with ease. Moreover, the present invention displays a handler for those virtual objects among multiple virtual objects contained in virtual space whose size as a proportion of the view volume of the observer is within a certain predetermined range. By so doing, handler display remains uncomplicated, and the observer can easily grasp the handler that corresponds to a desired virtual object. In addition, because the virtual objects for which handlers are displayed changes according to the distance between the virtual objects and the observer, the observer can identify the handler associated with the desired virtual object simply by moving the correct distance for manipulation of the desired virtual object.

In addition, because it is possible to manipulate the handler using the hand(s) of the observer, there is no need for an additional manipulation means for manipulating the virtual object. As a result, the user can manipulate the virtual object without losing the reality of the mixed reality.

Other Embodiments

Although in the embodiment described above the observer is one person, in the mixed reality presentation system of the present embodiment as described above a plurality of observers can be accommodated. If multiple observers are present, the handler display criteria and types may be the same for all observers, or they may be different for each observer.

The embodiment described above can also be implemented as software by a system or an apparatus computer (or CPU, MPU or the like).

Therefore, a computer program supplied to a computer in order to implement the embodiment described above by such computer itself also implements the present invention. That is, a computer program for implementing the function of the embodiment described above is itself within the scope of the present invention.

It should be noted that a computer program for implementing the embodiment described above may be in any form provided that it is computer-readable. Such a program may be executed in any form, such as an object code, a program executed by an interpreter, or script data supplied to an OS, but is not limited thereto.

Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a non-volatile semiconductor memory or the like.

As for the method of supplying the program using wire/wireless communications, there is, for example, a method in which a data file (program data file), either a computer program itself that forms the invention or a file or the like that is compressed and automatically installed, and capable of becoming the computer program that comprises the invention on a client computer, is stored on a server on a computer network. The program data file may be in an executable format, or it may be in the form of source code.

Then, the program data file is supplied by downloading to a connected client computer accessing the server. In this case, the program data file may also be divided into a plurality of segment files and the segment files distributed among different servers.

In other words, a server device that provides program data files for implementing the functional processes of the present invention by computer to one or more client computers is also covered by the claims of the present invention.

It is also possible to encrypt and store the program of the present invention on a storage medium, distribute the storage medium to users, allow users who meet certain requirements to download decryption key data from a website via the Internet, and allow these users to decrypt the encrypted program by using the key data, whereby the program is installed in the user computer.

Besides cases where the aforementioned functions according to the embodiments are implemented by executing the read program by computer, an operating system or the like running on the computer may perform all or a part of the actual processing, so that the functions of the foregoing embodiment can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or part of the actual processing so that the functions of the foregoing embodiment can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-214881, filed on Aug. 7, 2006, which is hereby incorporated by reference herein in its entirety.

What is claimed is:

1. A control method for a mixed-reality presentation system that presents an observer with a mixed reality by superimposing a virtual object rendered according to a position and orientation of a viewpoint of the observer onto a physical space or onto a sensed image of physical space, the control method comprising:
using a processor to perform:
a measuring step of measuring the position and orientation of the viewpoint of the observer;
a virtual object detection step of detecting one or more virtual objects included in a view volume based on the position and orientation of the viewpoint obtained in the measuring step; and
an adding step of adding a manipulation virtual object to each virtual object, from among the one or more virtual objects to be rendered included in the view volume, that satisfies set display conditions,
wherein the display conditions are set as ranges relating to a size of the one or more virtual objects occupying the view volume, a surface area of a projected image of the one or more virtual objects occupying a clipping plane, a number of pixels in the image of the one or more virtual objects, a number of polygons in the one or more virtual objects, a distance between the one or more virtual objects and the viewpoint of the observer, a movement velocity of the viewpoint of the observer and the one or more virtual objects, a range within a color space of the one or more virtual objects, and
wherein the adding step determines whether the manipulation virtual object is to be added or not for each virtual object of the one or more virtual objects included in the view volume, and adds the manipulation virtual object to each of those virtual objects that satisfies the set display conditions.

2. The control method for mixed-reality presentation system according to claim 1, wherein the adding step deletes the manipulation virtual object associated with virtual objects that no longer satisfy the set display conditions from among the one or more virtual objects to be rendered.

3. The control method for mixed-reality presentation system according to claim 1, wherein the adding step sets a position of the manipulation virtual object to a position that does not overlap the virtual object associated with the manipulation virtual object, and further, where the observer can manipulate the manipulation virtual object by hand.

4. The control method for mixed-reality presentation system according to claim 1, further comprising:
a manipulation detection step of detecting a manipulation by the observer of the manipulation virtual object; and
a changing step of changing rendering attributes of the virtual object so that a manipulation detected in the manipulation detection step is reflected in rendering results of the virtual object associated with the manipulation virtual object.

5. The control method for mixed-reality presentation system according to claim 4, wherein the manipulation detection step detects the manipulation based on a region of the observer's hand(s) included in an image sensed from a vicinity of the position of the viewpoint of the observer.

6. The control method for mixed-reality presentation system according to claim 1, wherein the display conditions are determined by a distance between the one or more virtual objects and the viewpoint of the observer, a movement velocity of the viewpoint of the observer, or relative velocities of the viewpoint of the observer and the virtual object.

7. A mixed-reality presentation system that presents an observer with a mixed reality by superimposing a virtual object rendered according to a position and orientation of a viewpoint of the observer onto a physical space or onto a sensed image of physical space, the mixed-reality presentation system comprising:
a measuring unit constructed to measure the position and orientation of the viewpoint of the observer;
a virtual object detection unit constructed to detect one or more virtual objects included in a view volume based on the position and orientation of the viewpoint obtained by the measuring unit; and
an adding unit constructed to add a manipulation virtual object to each virtual object, from among the one or more virtual objects to be rendered included in the view volume, satisfies set display conditions,
wherein the display conditions are set as ranges relating to a size of the one or more virtual objects occupying the view volume, a surface area of a projected image of the one or more virtual objects occupying a clipping plane, a number of pixels in the image of the one or more virtual objects, a number of polygons in the one or more virtual objects, a distance between the one or more virtual objects and the viewpoint of the observer, a movement velocity of the viewpoint of the observer and the one or more virtual objects, a range within a color space of the one or more virtual objects, and
wherein the adding unit determines whether the manipulation virtual object is to be added or not for each virtual object of the one or more virtual objects included in the view volume, and adds the manipulation virtual object to each of those virtual objects that satisfies the set display conditions.

8. A computer readable storage medium storing a program for causing a computer to function as the mixed-reality presentation system according to claim 7.

* * * * *